United States Patent
Newman et al.

(10) Patent No.: US 6,757,551 B2
(45) Date of Patent: Jun. 29, 2004

(54) PERSONAL COMMUNICATOR

(75) Inventors: Edward G. Newman, Fairfax Station, VA (US); Hussein Sallam, Columbia, MD (US); Peter A. Ronzani, Los Gatos, CA (US); Robert G. Schultz, Berkley, MA (US); Richard Ng, Centreville, VA (US)

(73) Assignee: Xybernaut Corporation, Fairfax, VA (US)

( * ) Notice: Subject to any disclaimer, the term of this patent is extended or adjusted under 35 U.S.C. 154(b) by 631 days.

(21) Appl. No.: 09/839,426

(22) Filed: Apr. 20, 2001

(65) Prior Publication Data

US 2002/0022499 A1 Feb. 21, 2002

Related U.S. Application Data

(63) Continuation-in-part of application No. 09/443,024, filed on Nov. 18, 1999.

(51) Int. Cl.[7] .................................................. H04B 1/38
(52) U.S. Cl. ............................... 455/556.1; 455/556.2; 455/346; 455/349; 455/575.1; 361/681; 361/686
(58) Field of Search ....................... 455/556.1, 556.2, 455/66.1, 575.1, 346, 347, 349; 361/683, 681, 686

(56) References Cited

U.S. PATENT DOCUMENTS

| | | | | |
|---|---|---|---|---|
| 5,768,100 A | * | 6/1998 | Barrus et al. | 361/686 |
| 6,035,214 A | * | 3/2000 | Henderson | 455/556.1 |
| 6,052,279 A | * | 4/2000 | Friend et al. | 361/686 |
| 6,085,112 A | * | 7/2000 | Kleinschmidt et al. | 455/556.1 |
| 6,137,686 A | * | 10/2000 | Saye | 361/732 |
| 6,157,533 A | * | 12/2000 | Sallam et al. | 361/683 |
| 6,259,932 B1 | * | 7/2001 | Constien | 455/556.1 |
| 6,317,315 B1 | * | 11/2001 | Lee et al. | 361/681 |
| 2001/0034250 A1 | * | 10/2001 | Chadha | 455/566 |

* cited by examiner

*Primary Examiner*—Edward F. Urban
*Assistant Examiner*—Huy Phan
(74) *Attorney, Agent, or Firm*—James J. Ralabate, Esq.; Christopher M. Tucker

(57) ABSTRACT

This invention provides a single unit called a personal communicator that combines the functions of a cell phone (or mobile phone), a body-supported computer and a pager. The personal communicator has three detachable modules:
1. a communications module;
2. a display module; and
3. a core computer module The core computer module has all of the components of a general purpose computer. Each of the modules when detached can be used in other systems such as with larger screens.

10 Claims, 7 Drawing Sheets

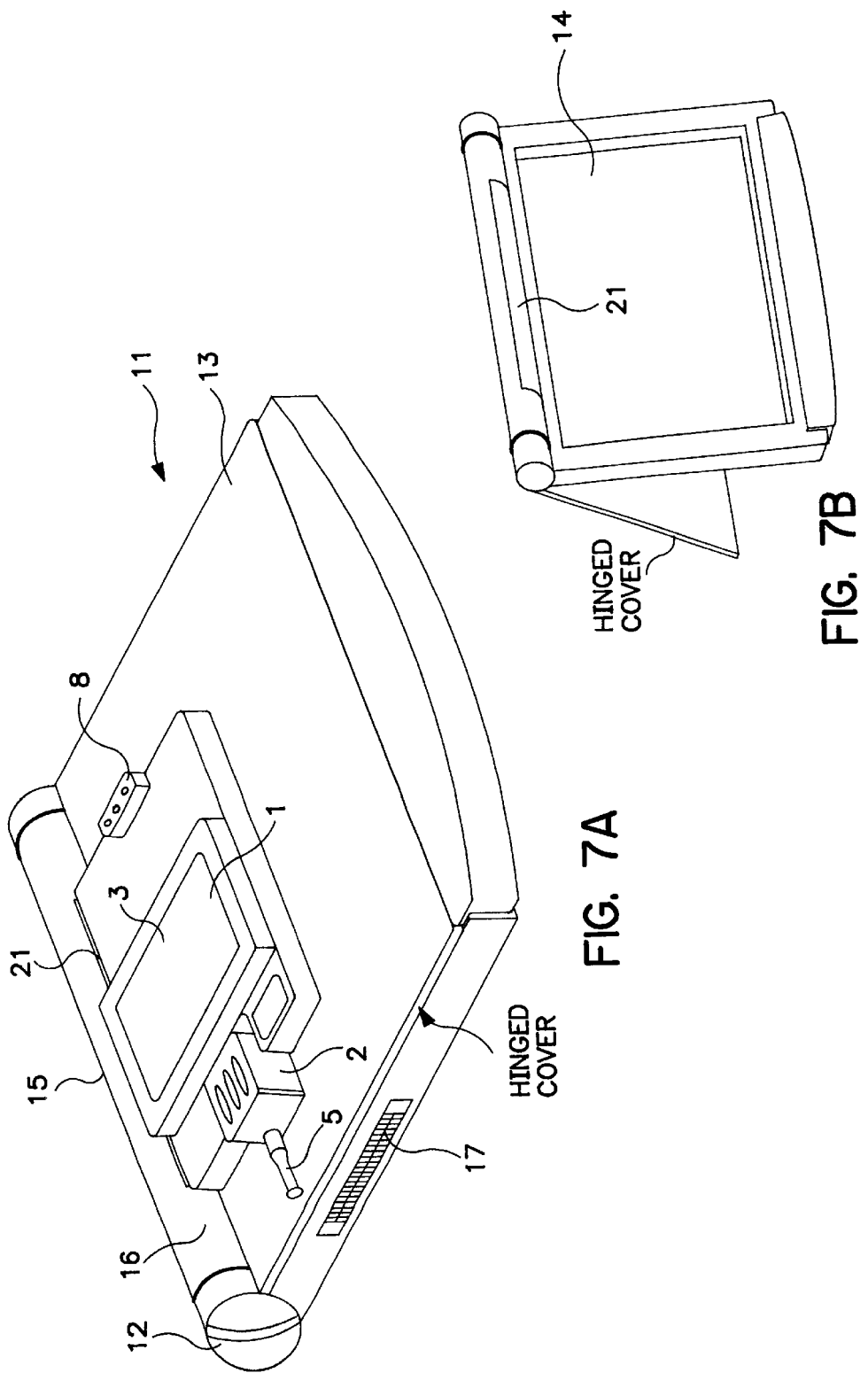

PERSONAL COMMUNICATOR

This application is a Continuation in Part application of parent application Ser. No. 09/443,024, filed Nov. 18, 1999.

This invention relates to a portable communication means and more specifically to a novel communicator comprising phone functionality, pager functionality and computer functionality.

BACKGROUND OF THE INVENTION

In U.S. Pat. No. 6,085,112 (Kleinschmidt) a communication device is disclosed having a computer with speech input and output devices combined in one structure. The computer portion of Kleinschmidt's device can be removed, while the other components remain intact. The telephone and display components are not removable in the Kleinschmidt communication device but rather these two components are always used together, either alone or with the computer component. This limits the flexibility of his structure and permits limited use for the telephone and display components.

Sainton U.S. Pat. No. 6,134,453 discloses a docking means using an enlarged monitor, Barrows U.S. Pat. No. 5,768,100 discloses means for a computer module to be docked into a monitor having a display with greater resolution than the display itself, and Voroba U.S. Pat. No. 6,091,965 discloses a personal communicator that has means to be attached to the body of the user.

None of these alone noted prior art patents, however, discloses or teaches the use of a personal communicator that has a modular configuration where all of the modules are detachable or removable from the structure. It is very desirable, for example, to have a detachable computer that can be used in other systems, a detachable communicators module (phone) that can be used by itself or in a second system and a detachable display module so that it can be replaced with a large display or it can be used as a monitor in another system. Having only the computer module detachable does not afford maximum flexibility to the personal communicator apparatus. Therefore, it is strongly preferred that for best results and more universal use a system be provided that all of the modules be detachable.

It is also known to use a hand-carried cellular or other type of phone or wireless communicators or radio communication. It is also known to use a portable pager with means for multiple pager messages and a pager display. Typical cellular phones and pagers are described in U.S. Pat. Nos. 5,884,188; 5,933,088; and 5,940,742. Also wearable hands-free computers are known, the most popular being Xybernaut Corporation's Mobile Assistant. This hands-free computer is described in U.S. Pat. No. 5,304,244 (Newman I) and U.S. Pat. No. 5,844,824 (Newman II), both owned by Xybernaut Corporation. Since phones, pagers and computers have been extensively used, it has become awkward to have to carry each on the person. In addition, wearable computers will be the next generation computer, and it is not a stretch of the imagination to consider that soon every business person will carry one around all day.

In U.S. Pat. No. 5,844,824 (Newman II) there is a clear disclosure of the use of cellular or radio or handwire telephone communication means used with a mobile computer, claim 6 of Newman II clearly defines this concept. The disclosure of Newman II on specifics of such a combination is incorporated by reference into this disclosure. Also Xybernaut Corporation has several U.S. Pat. Nos. 5,999,952; 6,029,183 and 6,157,533 which disclose respectively transferable core computer systems, core computer units, and modular wearable computers; each of these patents disclose concepts relevant to the present invention. By "core computer module" is meant in this disclosure and claims the core unit of U.S. Pat. No. 5,999,952 and 6,029,183. It is critical to this invention that all aspects of core computer module be present in said module. In U.S. Pat. No. 6,029,183 and 5,999,952 a mobile core unit is disclosed which has all of the components of a general purpose computer (except for a display). This core unit by itself is non-functional as a computer unless it is in electrical contact with an enclosure, which also supplies functionality. The enclosure has several connector ports for attachment of peripherals to the system. U.S. Pat. No. 6,157,533 discloses the invention where computer-containing modules are each assembled together to form a conventional computer, except that the computer is body worn and has heatcontrolling aspects.

While some of the above patents disclose mobile phones, two-way radios, pagers and computers, the disadvantage is that none of these patents suggest the use of a single easily carried mobile structure which is modular and can provide a detachable or removable telephone function, a detachable computer function, detachable e-mail, personal organizer, facsimile and pager function, or a detachable display function.

A prior art problem is that there is no one completely detachable device that can perform or handle multiple inputs from different sources (e.g. pager, communication device, personal e-mail device, computer, personal organizer) and, because of that, a user must carry around multiple devices. Prior art small computers in phones do not have the capacity and memory to be effective as a general purpose computer while worn or if removed and used with other higher requirement enclosures. Computer can store a multitude of information without going through a central phone location. Additionally, if a sending party only has the capability to send information in one format (e.g. paper/electronic fax, phone, etc.) and the receiving party does not have the ability to accept (receive) a paper fax, pager, or if the receiving party currently cannot receive electronic faxes because he only has a cell phone or if his laptop is in the backseat of his car and he is driving down the freeway, the receiving party must wait until it is safe to download the fax from staging area using his or her laptop and cell phone or, in the case of highly sensitive information, the sending party would need to wait before sending the fax until the receiving party can guarantee the safe delivery of the fax.

Currently, when a third party needs to notify or transmit information to another person, this transmission depends on the type of information that needs to be conveyed and the capability of the receiving person to receive this information. The ability of the receiving party to receive this transmission is limited to the device he or she is carrying, i.e. pager or phone, etc. That is, the ability today to communicate information to a given person is limited by not only what capability the receiving person has access to or in their possession, but also what the sending party has access to or is in his or her possession. For example, if a person needs to show the receiving party an important fax, the receiving person will most likely need a device that can receive and display that information. This is possible when the receiving party has that capability (usually a cell phone connected to a computer) or when a fax machine is located nearby (in hotel room, office or some other physical location). But what happens when that information needs to be conveyed and all the user has in his or her possession is a pager or a cell phone? The important fax is either read over the cell phone to the intended receiving party or is faxed to a remote location whereby the receiving party can pick it up or the fax is sent to a staging area (typically e-mail or stored on the Internet for later downloading).

SUMMARY OF THE INVENTION

It is therefore an object of this invention to provide a mobile structure devoid of the above-noted disadvantages.

Another object of this invention is to provide one structure that can function as a computer, wireless phone and pager with each function detachable from the one structure.

Yet another object of this invention is to provide a modular structure that can be disassembled into a computer, pager and cellular phone when desired.

Still a further object of this invention is to provide a personal communicator unit containing a core module that can be broken out and attached to a larger display or monitor.

Yet, still a further object of this invention is to provide a personal communication means that integrates technology of wearable computers, cellular phones, and pagers, each attached to each other in a modular configuration.

Still another object of this invention is to provide a personal communication means with a core compute module that has means for connection to a high resolution FPD for shared viewing.

These and other objects of this invention are accomplished, generally speaking, by a personal communicator in modular form containing at least three modules that allows the removal of a communication (phone) module, a removable core computer module, and a removable display or pager module. It is important that each module be removable or detachable since they can be interchangeably be used in an infinite number of other systems or structures. Each module is configured with connecting means that are equally useful with the personal communicator modules and completely other different modules or systems. The term "personal communicator" means throughout this disclosure as the unit with all three modules, i.e. 1. communication module; 2. display module; 3. core computer module. In some embodiments the pager and core computer module can be included in one and the same module. The battery is located in any suitable module(s) or in a separate housing. The core computer module is identical to that described in U.S. Pat. Nos. 5,999,952; 6,029,183, and 6,157,533. Any suitable portable phone, including a cellular phone is known in the art and described in U.S. Pat. Nos. 5,884,188 and 5,870,678 may be used as the "communication means". Also any known or suitable pager module may be used such as the pager disclosed in U.S. Pat. Nos. 5,933,088 and 5,940,742. Any suitable e-mail known means may be incorporated in the structure of this invention. The personal communicator of this invention provides a small but effective display and an antennae, all of which will be defined later in relationship to the accompanying drawings. In addition, while the three module "personal communicator" i.e. communication module, display module and core computer module is highly preferred, other devices such as a camera, pager, still and/or video and/or television and/or a radio may be incorporated into the display module (or other modules). The display in the display module can act as the video display or television screen if this embodiment is used. Any known type radio, television, or camera can be used in the present invention, such as those already on the market. The central part of the communicator system of this invention is a computer; therefore, it can be adapted for use in any communication system, i.e. pager, phone, e-mail, facsimile, etc. When a user is located at his or her desk, the ability to send information (regardless of format) is simple. Desktop PCs can receive faxes, send and receive e-mail, download and view/use/manipulate data files, make phone calls (voice over IP), surf the web and perform other generic computer functions. To best mimic his or her desktop environment when leaving the office, it would be necessary to take along a cell phone, pager, personal organizer and laptop computer functions and, even though some of the capabilities of these devices overlap, they provide convenience to the user. They overlap primarily because, in some situations, the user, because of some function he or she is performing, is incapable of using certain devices. The present invention provides a convenient mobile, personal communicator capable of transmitting or receiving information via all of said functions. Whereas the designs based on prior art whenever they integrate communication capabilities typically have enough hardware resource to communicate with a single service provider, the present invention because of the detachable core module detachable communications module and detachable display module allows enough flexibility and resources to allow them to be used with many and different service providers on a call-by-call basis or in some multichannel implementations on a packet-by-packet basis. This allows the user to leverage the purchased personal communicator to use it with one or many service providers and change between them at will and not be locked into a single provider.

The computer core module, when detached, has the ability of hands-free activation, such as audio activation, eye-tracking activation means, electroencephalography activation means, head and arm activation means and mixtures thereof. All of these hands-free activation means are disclosed and described in detail in U.S. Pat. No. 5,844,824 which, as above noted, is incorporated by reference into this disclosure. The computer core may be body supported or attached to another enclosure as disclosed in U.S. Pat. No. 5,999,952. It is important to this invention that the computer module be composed of a general purpose computer and be removable together with the other modules and each have means to be used with other enclosures or systems other than the personal communicator of this invention. The present invention provides a communicator that can utilize any of the communication systems popular today, i.e. cell phone, pager, e-mail, computer, personal organizer and facsimile. Thus, a transmitter with only a pager can reach his or her party as will a transmitter with only a facsimile or phone reach this same party. The invention described herewith not only avoids the necessity for someone to carry multiple devices but also allows total range of the communication means to be transmitted or received.

The present structure in the preferred embodiment includes a compact, self-contained personal communicator that may be completely supported by a user for hands-free retrieval and display of information for the user. The self-contained computer module is a general purpose computer that must be attached to a power source. The completely enclosed housing must contain storage means for storing previously entered information, and processor means, communicating with the storage means, for receiving, retrieving and processing information and user commands in accordance with a stored program, including e-mail capabilities. It is highly preferred that the computer module housing be completely sealed so that its contents cannot be tampered with. Since large databases of ETMs and IETMs will be accessed by the mobile self-contained computing apparatus, a means of easily interfacing storage means containing the databases is required. The housing of the computing module includes an access port whereby various storage means containing data can be interfaced and communication established. Access and transfer of data between the storage means and the computing apparatus can be accomplished entirely under control of various hands-free activation means described in this application. The access port allows direct electrical attachment of the storage means; however, other wired and wireless connections are also used. When the computing module is removed and used by itself, activation means that can be used for the computer, display and communications modules include the above-described eye-tracking, brain-actuation means, head and arm-tracking means and mixtures thereof. The computing apparatus in a preferred embodiment, in addition to all of the conventional computer components, further includes display means in communication with the processor means for receiving information from the processor means and for displaying the received information for the user, the display means being supported by the user whereby the user may operate by the computing apparatus to display information in a hands-free manner utilizing only brain activation or eye tracking with or without audio commands.

As above noted, specifics of eye tracking and brain-actuated control (electroencephalography) and head and arm-tracking means are disclosed in detain in U.S. Pat. No. 5,844,824, which is incorporated by reference into this disclosure.

A further feature of an embodiment of the present invention utilizes an adapter used in each module to permit the use therein of cellular or hardwire telephone communication. In place of the cellular telephone communication means, a radiofrequency, infrared, laser or fiber optic transceiver or other communication means may be used. These will generally be referred to in this disclosure as "communication means".

The computer apparatus module of this invention may be interfaced with a telephone system in such a way as to provide hands-free telephone communication between multiple persons and/or computers. One or more of these may be performing telephone communications by using the present computer apparatus. As earlier noted, communications may include, but are not limited to, voice, data, including interrogation and control of built-in test codes, video images and sounds. Operation may be hands-free using the voice-activated feature of the present computer apparatus, manually-activated using a keypad or a combination of both.

Telephone systems that may be interfaced include, but are not limited to, RJ-11 wall jacks commonly found in homes and small businesses, multiple line telephone switching systems found in medium and large businesses, cellular communications, radio frequency communications interfaces and cordless accessories to any of the above.

The basic system incorporates the apparatus of this invention, i.e. hands-free body-worn computer with voice activation and a head-mounted or other user-supported display, a telephone system and a unique electronic interface between the two that integrates both traditional analog voice signals and computer data between the two components.

Integration of private, as well as public telephone communications into this system, may be accomplished using a voice/data modem (modular/demodular) as now used with existing computing systems. The modem is either built into the host computer or it can be inserted as "PCMCIA" or "PC Card" into the host computer. In addition, communication means in the headset can also utilize built-in modem to interface through communications means to a remote device. Using the communication means of the system, data and voice can be transmitted and received between headsets and mobile systems, as well as between mobile systems.

In a preferred embodiment of this invention a produce is provided containing two different sets of I/O's and two different form factors but using the same computer fundamental computer functionality and/or subassembly simply by swapping the computer functionality (may or may not contain additional functionality) between the two different sets. It is envisioned that the smaller set or structure will be a personal communicator containing the functionality of a wearable or hand-held computer, as well as telephony and other communications functionality. It is envisioned that at least one of the designs would include one of the sets or structures that contains a small FPD or other type of display that would fit in a jacket or shirt pocket, a set or structure that contains a large paper size (8.5"×11") or laptop size higher resolution FPD or other type of display and a common module containing the computer functionality as well as pager functionality. The large, high-resolution flat panel display set or structure solves a fundamental problem which arises with the small form factor computers that have screens too small for shared viewing by multiple people.

The design of this invention integrates wearable computer functionality, cellular phone, personal e-mail means, personal organizer functionality and pager functionality into a preferred single wearable or handheld personal communicator. The personal communicator is designed in a modular fashion in such a way as to enable the breakaway of modules containing one or more functions. The modules may be subsequently used in conjunction with a larger FPD or any other type of display. Of particular interest is a module containing the core functionality of a wearable PC and the functionality of a pager. Such a module can be broken out of the personal communicator and attached to a larger flat panel display as an accessory to constitute laptop functionality which may be packaged in a folio type packaging and designed to stand on a flat surface in an inverted V configuration for shared viewing.

All of the drawings and description of the drawings will be referred to using the audio activation means only of this invention; however, keyboard and pen activation may be used in the pager component while only audio activation may be used in the phone or communication module (cellular phone etc.) and the entire "personal communicator". A keyboard or touch screen may be used on the phone module, by itself or in combination with voice activation. The touch screen may also be used as the display means.

BRIEF DESCRIPTION OF THE DRAWING

FIG. 7A is a perspective top view that shows a closed folio with a larger screen and with the unit 1 docked therein or thereon. FIG. 7B is a perspective front view of a folio in an open mode without the unit 1 docked therein.

DETAILED DESCRIPTION OF THE DRAWINGS AND PREFERRED EMBODIMENTS

Figure 1:
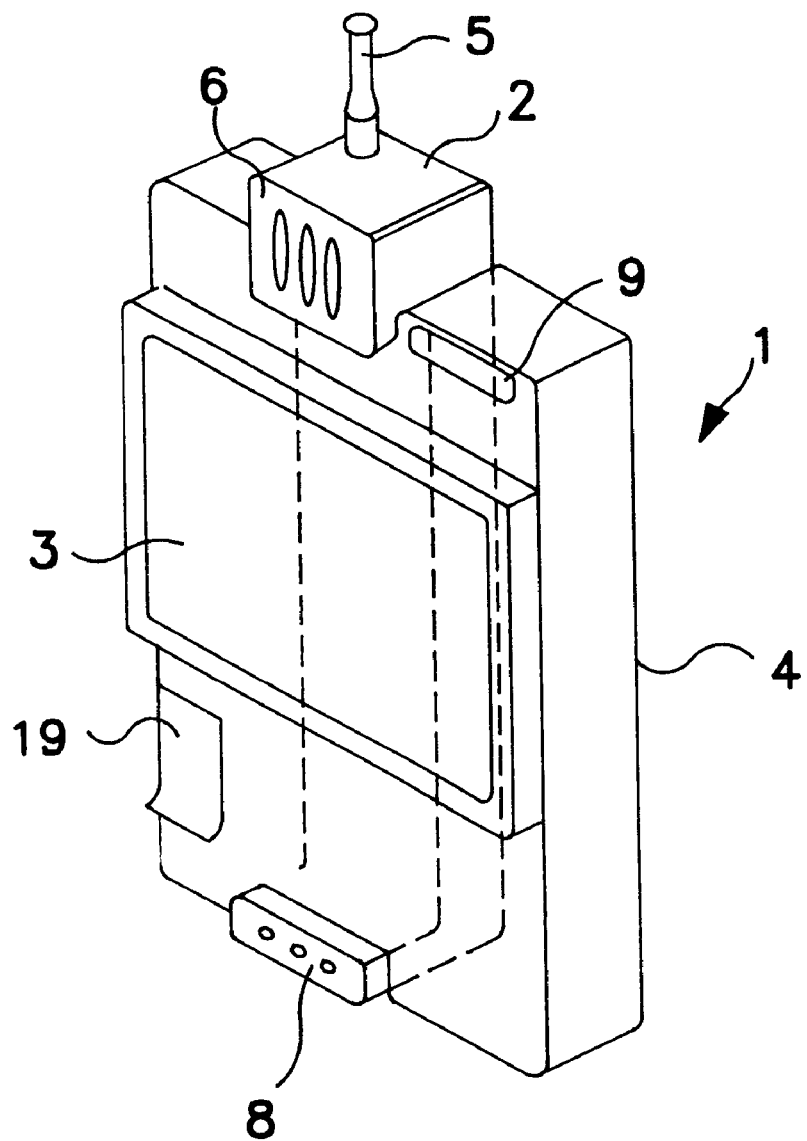
FIG. 1 is a back perspective view of the personal communicator of this invention with the communications and core computer module shown connected together.
Figure 2:
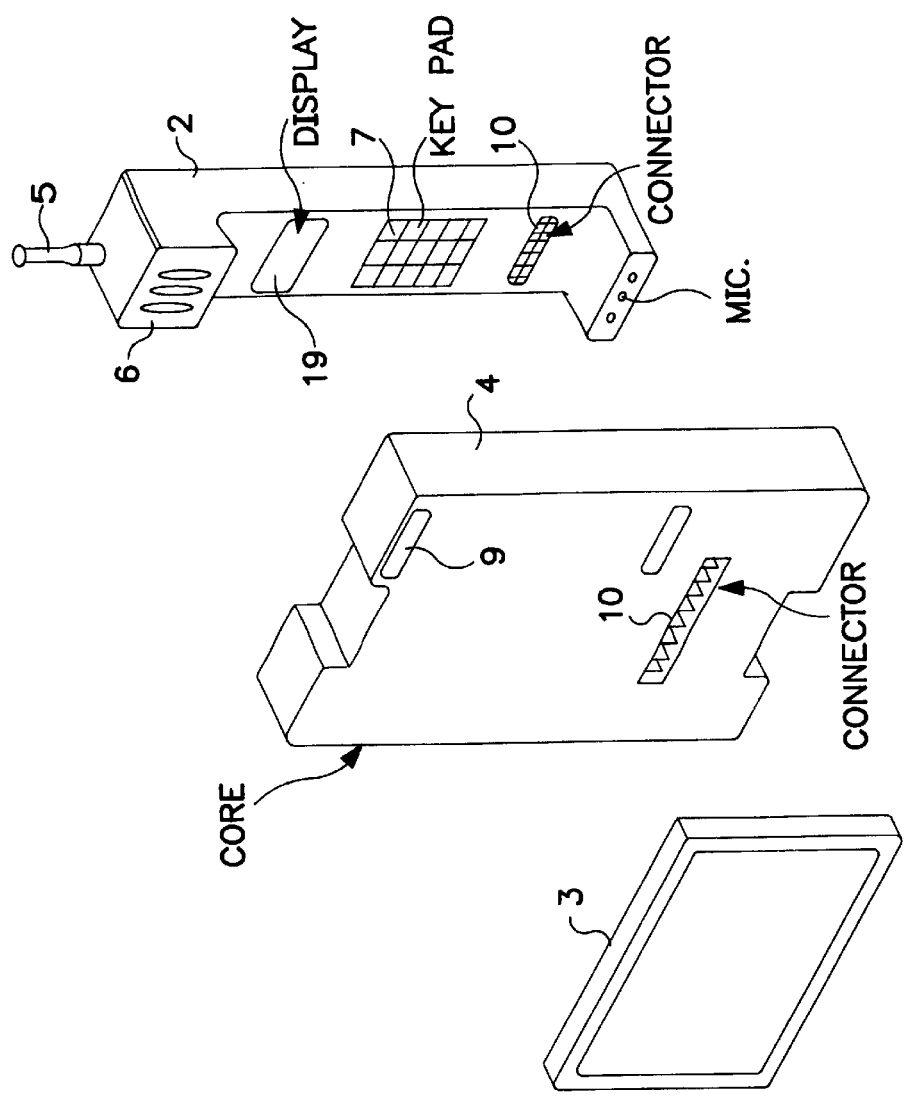
FIG. 2 is a front perspective view of one embodiment of the personal communicator of this invention with the modular components detached from each other.

In FIGS. 1 and 2 a first embodiment, the hand-held personal communicator 1 of this invention, is illustrated having three removable modules, a communications module 2, a display module 3 and a core computer module 4. The core computer module 4 in one embodiment of this invention contains also a pager with a small display 9. The personal communicator 1 integrates wearable computer functionality with cellular phone and pager functionality, only one small unit 1 needs to be worn rather than three separate cumbersome units. The computer module 4 is designed so that it can subsequently be used in conjunction with a larger flat panel display or any other structure as would a general computer. A unique feature of this invention is that each module 2, 3, or 4 can be subsequently used in other systems. Also, an accessory such as a member selected from the group consisting of radio, television, video camera, still camera, or mixtures thereof may be used in or integral with at least one of modules 2, 3, or 4. The personal communicator or the core computer module 4 in a preferred embodiment has means 20 for a connection to a user, such as around his or her waist, torso or wrist. Connecting means 20 can be either or both on the front or back of unit 1. The core computer module 4 can be broken away from the personal communicator 1 and attached or connected to a larger flat panel display (FPD) t constitute laptop functionality. The FPD may be a folio type design having means to stand on a flat surface in an inverted V configuration for shared viewing as illustrated in FIGS. 7A and 7B. The unit 1 in FIG. 1 has an antenna 5, as does a conventional cell phone (or other communication means). This same (or an additional antenna 5) may be used when a radio or television is used in the system. The radio, television or camera accessories are not specifically shown in the drawings since they would be illustrated as internal and integral with and would not change the appearance of modules 2, 3, or 4. For example, the display module 3 could also be the television screen and the touch board or screen 7 could be the channel or radio station selector. The volume on both can be controlled by any suitable known means. In the communications module 2 is positioned an ear piece 6 and a microphone 8 into which the user wills peak when unit 1 is used as a mobile or cellular phone. A touch screen 7 is positioned between the communications module 2 and core module 4; the touch screen 7 has a dual use; it is used to touch the phone number being called and it can be used as the display for the personal communicator 1 and/or the core computer module 4. By "core computer" module is means in a preferred embodiment a detachable general purpose computer having the preferred parameters set out in U.S. Pat. No. 5,999,952.

By "display module" is meant throughout this disclosure a detachable display having preferably at least full VGA resolution and means to be used in other systems.

Figure 3:
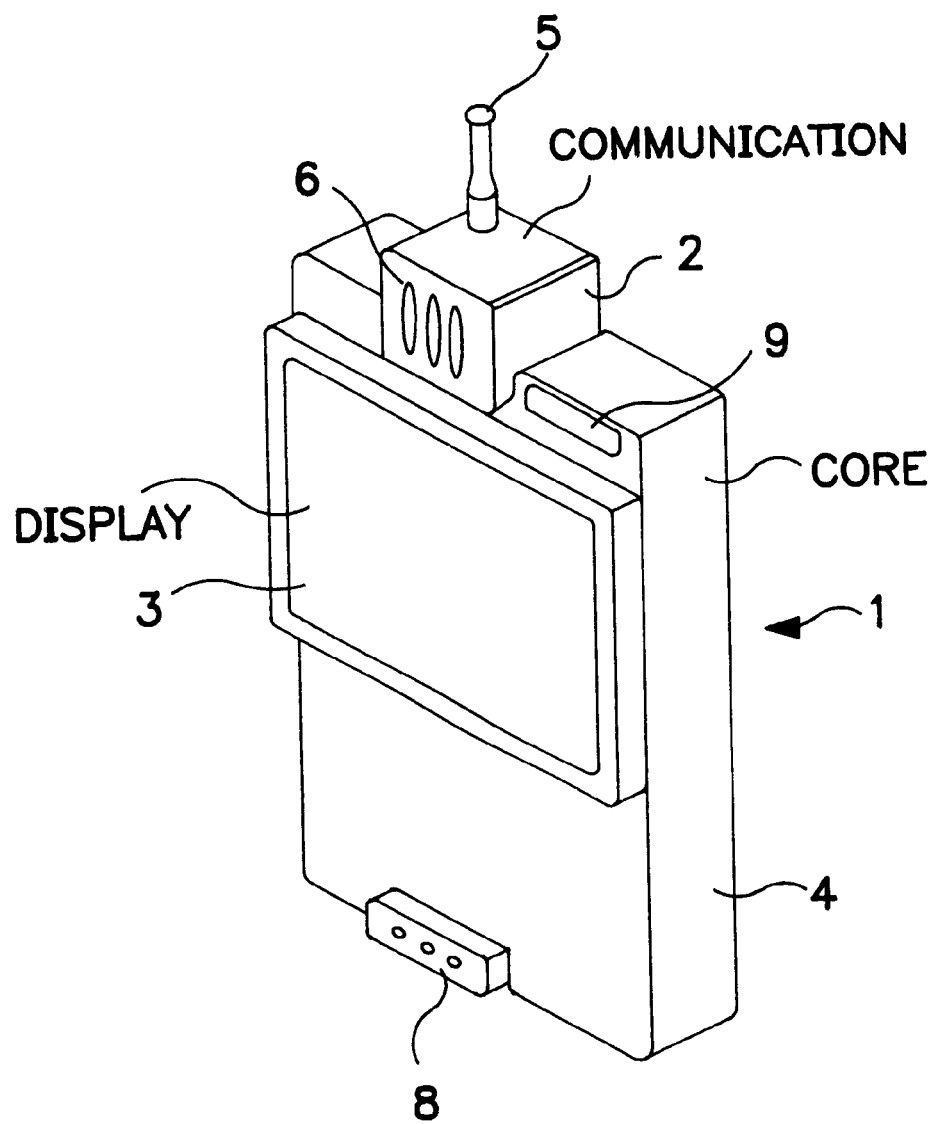
FIG. 3 is a front perspective view of an embodiment of the personal communicator of this invention with the three modules all attached to each other.

In FIG. 3, an embodiment of the personal computer 1 is shown where each module is attached. In this embodiment detachable communications module 2 with touch screen 7 is attached to core module 4 and display module 3. Core computer module 4 in this embodiment contains the pager and pager screen 9. The display module 3 in this illustrated FIG. 3 may contain, if desirable, any known television, radio, video, or still camera with the conventional structures known in the art. Also display module 3 has means to accept text (or other information) being transmitted to the unit 1 via facsimile.

Figure 4:
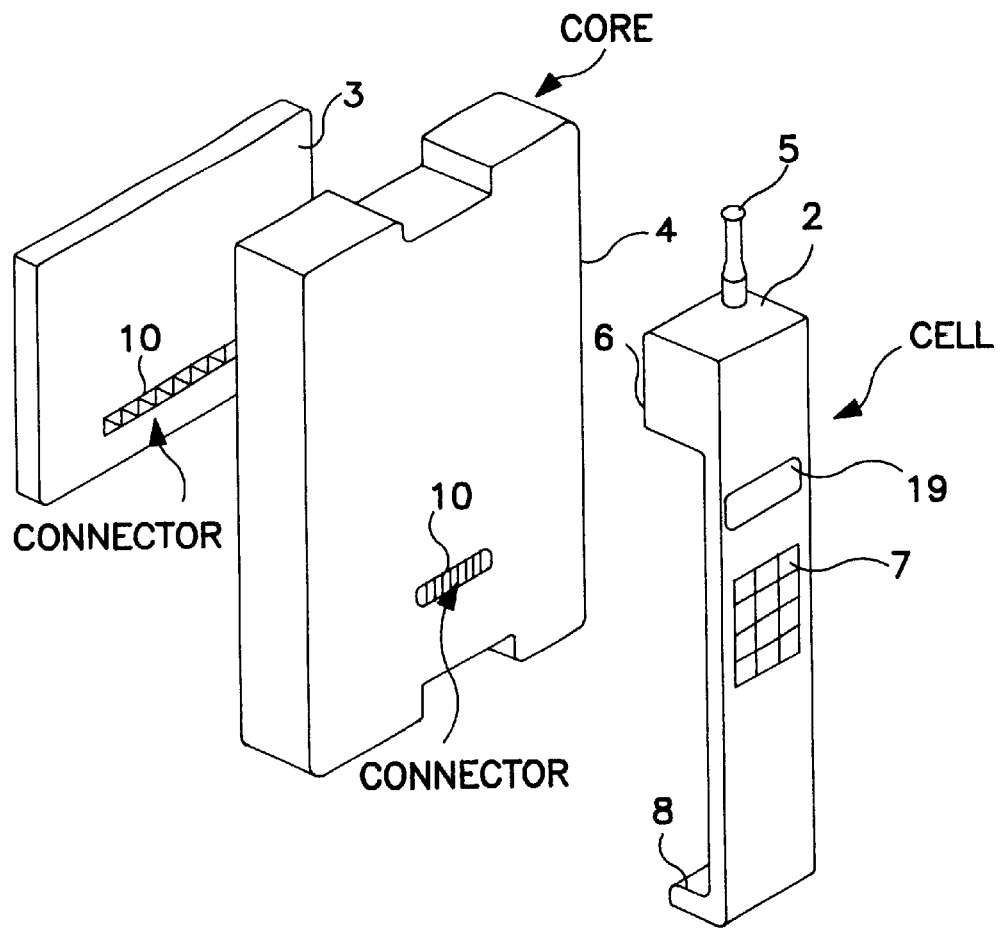
FIG. 4 is a back perspective view of the personal communicator of FIG. 3 when all of the modules are detached from each other.
Figure 5:
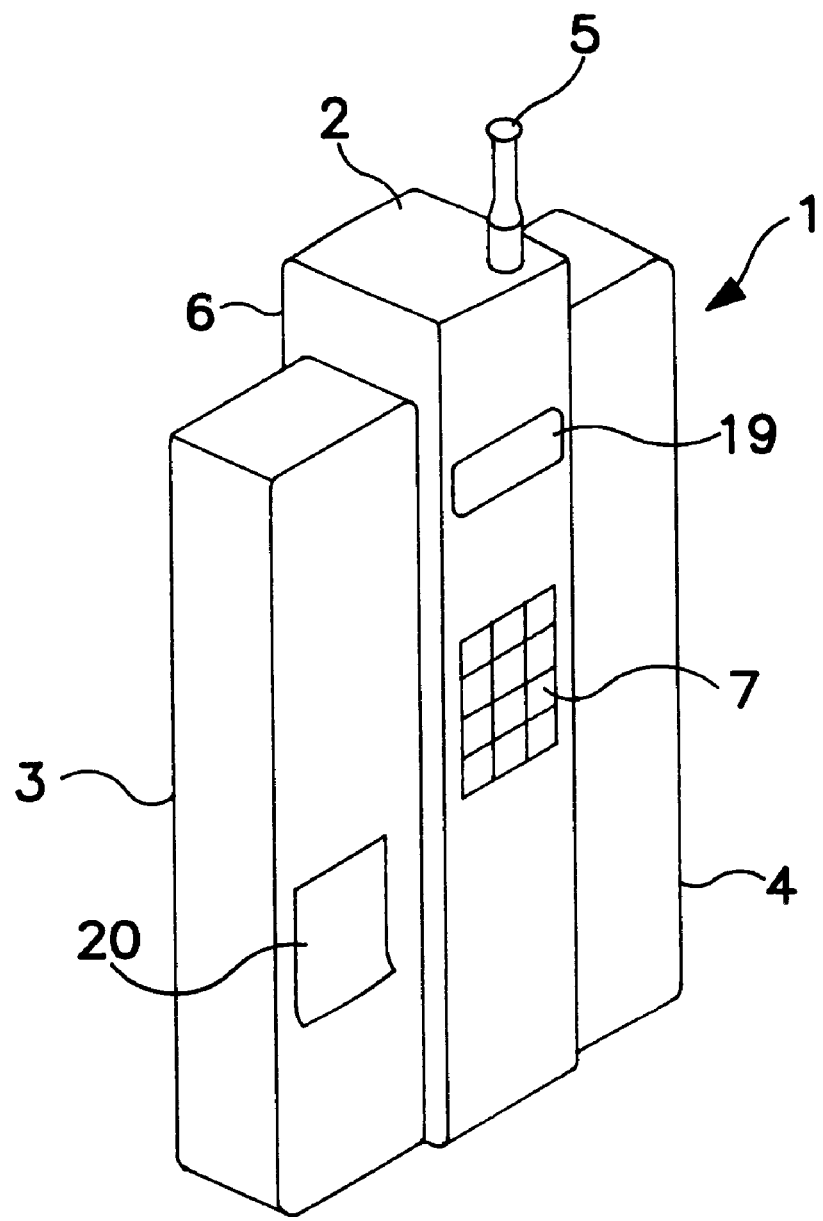
FIG. 5 is a back perspective view of an embodiment of this invention with all of the modules connected and in place.
Figure 6:
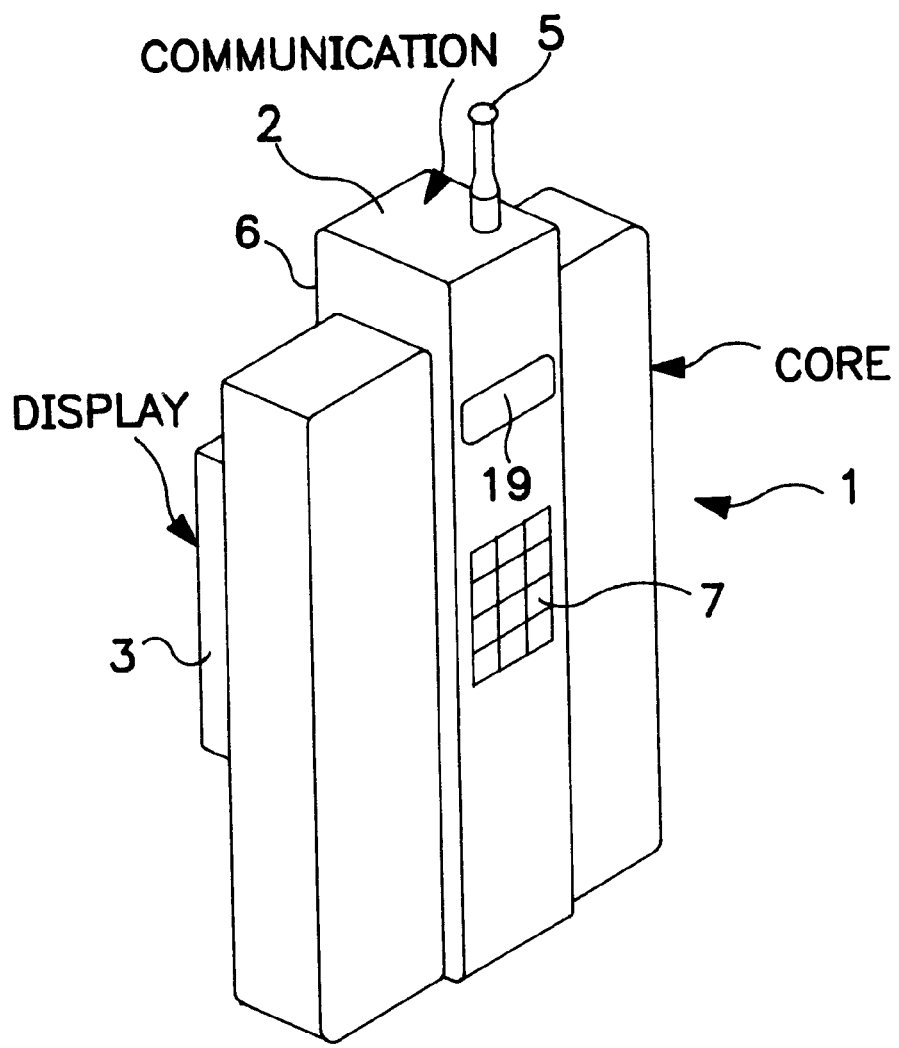
FIG. 6 is a back perspective view of an embodiment of this invention with all of the modules connected and showing the position of the display modules in place.

In FIG. 4 the back portions of each module is shown with electrical connectors 10, which are used to put each module in electrical and physical connection with each other. In this embodiment the computer and pager are in module 4 and can be attached to a larger FPD, as shown in FIGS. 7A and 7B for better resolution and for shared viewing. FIG. 4 shows the same embodiment as in FIG. 3, except that the modules 2, 3, and 4 are disconnected from each other. In all embodiments of FIG. 1 through FIG. 4, any suitable battery may be used as in a conventional wearable computer of U.S. Pat. No. 5,844,824 or telephone mentioned above in the Background of the Invention. In FIGS. 5 and 6 the unit 1 is shown in a back view when each module 2, 3, and 4 are connected. In this embodiment the keypad 7 is on the outside of communications module 2 so that the pad 7 can be used when the modules are assembled. Phone display 19 is also positioned in the back so it also may be used when assembled.

As noted earlier, the display module 3, communications module 2 and core module 4 can be removed from personal communicator 1 or entire unit 1 may be used in any suitable enclosure or can be used with a larger FPD like the folio 11 shown in FIGS. 7A and 7B. In FIGS. 7A and 7B an inverted V-shaped folio 11 is illustrated having a battery stick 12, a hinged cover 13 and a large display screen 14. The opened folio 11 of FIG. 7B can stand firmly on a flat surface and with the computer module 4 (or unit 1) as shown docked in docking opening 21 into FIG. 7A can give the user a functionality that constitutes a laptop functionality. The battery stick 12 fits into the hinged portion or housing 15 and provides the power required similar to the laptop requirements. The housing 15 contains a dock port or opening 16 in which unit 1 or core computer module 4 will fit when used with folio 11. FIG. 7A shows unit 1 (or personal communicator 1) docked ready for use and display via monitor or display screen 14. Also provided in folio 11 is a number of peripheral ports 17 for connection to audio jacks, ear phones, head mounted displays, or any other suitable peripherals.

The preferred and optimumly preferred embodiments of the present invention have been described herein and shown in the accompanying drawings to illustrate the underlying principles of the invention, but it is to be understood that numerous modifications and ramifications may be made without departing from the spirit and scope of this invention; for example, as earlier noted the modules while preferred to be removable or detachable can be all attached as a permanent unit. Also, while the preferred parameters include at least 80 MB of mass storage memory, if desirable, a lower suitable MB may be used.

What is claimed is:

1. A personal communicator comprising in combination three modules, said modules have means that allow each to be removable and have means to keep each module connected to each other, said modules being a communications module, a display module and a core computer module, said core computer module having a housing, including therein non-volatile storage means for storing previously entered information, said housing of said core computer module wherein all components are completely enclosed therein and may not be removed or replaced, processor means in communication with said storage means, and means to retain stored information when detached from said personal communicator, said communication module having an ear piece with means to cooperate and function with a microphone located in said personal communicator in or outside said communication module to act thereby as a mobile telephone, said personal communicator having activation means selected from the group consisting of touch activation, audio activation and mixtures thereof, each of said detachable modules when detached having means to function when connected to or when detached and used with other enclosures or attachments, and wherein said core computer module is non-functional as a computer unless it is in electrical contact with an enclosure which also supplies functionally.

2. The core computer module of claim 1 with all of the components of a general purpose computer and having when detached activation means selected from the group consisting of audio activation means, eye-tracking activation means, electroencephalography activation means, head and arm tracking means, touch activation means and mixtures thereof.

3. The personal communicator of claim 1 having included therein a member selected from the group consisting of a television means, a radio means, a still camera means, a video camera means and mixtures thereof.

4. The personal communicator of claim 1 wherein said core computer module comprises a member selected from the group consisting of a pager, pager functionality, display screen, e-mail functionality and mixtures thereof.

5. The personal communicator of claim 1 having means to be docked into a monitor having a display substantially larger and with greater resolution than the display in said display module.

6. The core computer module of claim 1 having means to be docked into a monitor having a display substantially larger and with greater resolution than the display in said display module, said core computer module having means to function with e-mail, as a personal organizer and electronic facsimile.

7. The personal communicator of claim 1 having means for attachment to the body of the user.

8. The personal communicator of claim 1 when assembled with each of said detachable modules connected, having an antenna and an ear piece in said detachable communications module and a mouth piece or microphone in said communications or said core computer module, thereby having means to function as a mobile phone, both when said communications module is connected and disconnected from the core computer and display modules.

9. The personal communicator of claim 1 wherein said core computer module has means to interface with external sources of data and information.

10. The core computer module of claim 1 having means to communicate with a function selected from the group consisting of U.S.B., communication serial ports, floppy disks, video graphic adapters, P.C.I. Bus, display means, audio input/output means, power means, IrDA means, PCM-CIA cards, activation means and mixtures thereof.

* * * * *